United States Patent
Tian et al.

(10) Patent No.: US 12,388,328 B2
(45) Date of Patent: Aug. 12, 2025

(54) ELECTRIC MOTOR STATOR STRUCTURE AND POURING AND SEALING METHOD THEREFOR

(71) Applicant: ZHEJIANG PANGOOD POWER TECHNOLOGY CO., LTD., Zhejiang (CN)

(72) Inventors: Jingcheng Tian, Jinhua (CN); Zheng Yuan, Jinhua (CN); Zhibo Wang, Jinhua (CN)

(73) Assignee: ZHEJIANG PANGOOD POWER TECHNOLOGY CO., LTD., Zhejiang (CN)

( * ) Notice: Subject to any disclaimer, the term of this patent is extended or adjusted under 35 U.S.C. 154(b) by 266 days.

(21) Appl. No.: 17/792,930

(22) PCT Filed: Jun. 1, 2020

(86) PCT No.: PCT/CN2020/093817
§ 371 (c)(1),
(2) Date: Jul. 14, 2022

(87) PCT Pub. No.: WO2021/143030
PCT Pub. Date: Jul. 22, 2021

(65) Prior Publication Data
US 2023/0076925 A1    Mar. 9, 2023

(30) Foreign Application Priority Data
Jan. 15, 2020   (CN) .......................... 202010043529.7

(51) Int. Cl.
*H02K 9/22*    (2006.01)
*H02K 15/12*   (2025.01)
*H02K 16/02*   (2006.01)

(52) U.S. Cl.
CPC .............. *H02K 9/223* (2021.01); *H02K 15/12* (2013.01); *H02K 16/02* (2013.01)

(58) Field of Classification Search
CPC .... H02K 1/182; H02K 1/2793; H02K 1/2795; H02K 1/2796; H02K 1/2798; H02K 3/30;
(Continued)

(56) References Cited

U.S. PATENT DOCUMENTS 4,806,806 A * 2/1989 Hjortsberg ............... H02K 3/30
174/120 SR
6,956,309 B2 * 10/2005 Aulanko ................ H02K 1/182
310/67 R
(Continued)

FOREIGN PATENT DOCUMENTS

CN    1394377 A    1/2003
CN    207149543 U  3/2018
(Continued)

OTHER PUBLICATIONS

Knappenberger, Machine Translation of DE102011085051, Apr. 2013 (Year: 2013).*
(Continued)

*Primary Examiner* — Eric Johnson
(74) *Attorney, Agent, or Firm* — Kilpatrick Townsend & Stockton LLP

(57) ABSTRACT

Disclosed is an electric motor stator structure, belonging to the technical field of electrical manufacturing. The electric motor stator structure solves the problems in the prior art of a large amount of adhesive being required for adhesive pouring of electrical elements and high cost. According to the electric motor stator structure, large-particle-size solid particles are arranged in large-size gaps between a shell, an iron core and/or a winding; small-size gaps between the shell, the iron core, the winding and/or the large-particle-
(Continued)

size solid particles are filled with an adhesive layer; the adhesive layer is formed by solidifying a liquid adhesive; the adhesive comprises a binding agent and heat-conducting insulating powder; and the particle size of the large-particle-size solid particles is greater than that of the heat-conducting insulating powder.

14 Claims, 3 Drawing Sheets

(58) Field of Classification Search
CPC ............ H02K 3/32; H02K 3/325; H02K 3/34; H02K 3/38; H02K 9/22; H02K 9/223; H02K 15/10; H02K 15/105; H02K 15/12; H02K 15/125
See application file for complete search history.

(56) References Cited

U.S. PATENT DOCUMENTS

| | | | | |
|---|---|---|---|---|
| 2003/0001440 | A1* | 1/2003 | Bourqui | H02K 3/38 310/43 |
| 2012/0077921 | A1* | 3/2012 | Ishiuchi | C08K 5/098 524/430 |
| 2015/0069877 | A1 | 3/2015 | Otowa et al. | |
| 2019/0305628 | A1 | 10/2019 | Yamazaki et al. | |

FOREIGN PATENT DOCUMENTS

| | | | |
|---|---|---|---|
| DE | 102011085051 A1 | | 4/2013 |
| JP | 2017153230 A | * | 8/2017 |
| KR | 101294821 B1 | | 8/2013 |
| KR | 20190096218 A | * | 8/2019 |
| WO | WO-2021115632 A1 | * | 6/2021 ............. H02K 11/33 |

OTHER PUBLICATIONS

Kato, Machine Translation of JP2017153230, Aug. 2017 (Year: 2017).*
Lee, Machine Translation of KR20190096218, Aug. 2019 (Year: 2019).*
Imetra, Silicon Carbide Material Properties, 2024 (Year: 2024).*
Larson, Thermal Expansion of Silicones in Electronic Reliability, 2024 (Year: 2024).*
European Patent Office, Extended European Search Report Issued in Application No. 20914094.6, Jan. 26, 2024, Germany, 7 pages.
PCT International Search Report and Written Opinion, International Application No. PCT/CN2020/093817, dated Oct. 20, 2020, 8 Pages.

* cited by examiner

ELECTRIC MOTOR STATOR STRUCTURE AND POURING AND SEALING METHOD THEREFOR

The present disclosure is a 35 U.S.C 371 Patent Application of PCT Application No. PCT/CN2020/093817, filed on Jun. 1, 2020 which claims priority to the Chinese Patent Application No. 202010043529.7, titled "ELECTRIC MOTOR STATOR STRUCTURE AND POURING AND SEALING METHOD THEREFOR", filed with the China National Intellectual Property Administration on Jan. 15, 2020, each of which is hereby incorporated by reference in its entirety.

FIELD

The present disclosure pertains to the technical field of electrical manufacturing, relates to a motor stator structure, and in particular to a motor stator structure with adhesive being potted and a method for potting the same.

BACKGROUND

With the development of a new energy market, the requirements to new energy power systems are getting higher and higher, and the miniaturization and light weight of high-power motors play an important role. The miniaturization of the motors means the increase of a power density and high heat value per unit volume, which proposes higher requirements to a cooling system of the motors. The structure of existing motor products generally includes a rotor, a stator and a casing. More commonly, the stator and the casing are fixedly mounted to form a part of the motor. The schematic diagram of the structure of a casing, an iron core and a winding in a disc motor is shown as follows, in which the casing is provided with a mounting position of the iron core, the iron core is fixedly mounted on the casing, and the winding is wound around the iron core and arranged inside the casing.

SUMMARY

Technical Problem

A stator coil is a main heating component of a motor. During the operation, the coil is subjected to a high voltage and a large current and operates in a magnetic field changing in a high frequency, and a corresponding cooling structure is very difficult to design. Currently, potting by thermally conductive adhesive is a feasible solution for cooling the stator coil. Limited by the technological level, a relatively large deviation appears in the spatial structure of a winding after the winding is wounded and formed. In a disc motor, an annular inner side and an annular outer side of an annular winding are irregular. For this, in designing the casing, a cavity for accommodating the winding should be large enough to ensure that the winding can be normally mount in the casing so as to avoid bumping and squeezing of the winding, damaging an insulating enameled structure on the winding. In fact, it is required to design a certain safety distance to avoid direct contact between the coil and the casing, which results in a risk of electric leakage of the motor in a later stage. For this reason, there is an apparent and large gap between the coil and the casing. The above is described based on the distance of the disc motor, and in fact the similar situation exists in a radial motor.

In the production of high-quality motors, such as motors used in new energy vehicles, it is required to fill the gap between the casing and the winding with adhesive in an adhesive filling process, that is, an adhesive potting process. The adhesive can well realize the fixation, insulation and heat conduction of the winding. The so-called adhesive filling refers to filling a stator cavity with a special potting compound and solidifying the potting compound. The integrity of electronic devices can be strengthened by improving the adhesiveal potting performance, in order to improve the resistance to external shock and vibration; improve the insulation between internal components and lines, which facilitates the miniaturization and light weight of the devices; avoid direct exposure of the components and lines, and improve the performance of water resistance and moisture resistance of the devices. The potting compound is generally composed of a mixture of adhesive and thermally conductive filler. The adhesive acts as a bonding agent, and the thermally conductive filler are used to improve the thermal conductivity of the entire potting compound. Currently, conventional adhesives may be selected from epoxy resin, silicone resin, polyurethane, or the like, and the common thermally conductive insulating filler includes aluminum oxide, magnesium oxide, zinc oxide, aluminum nitride, boron nitride, silicon carbide, or the like. Main component is aluminum oxide and silicon powders in a unit of where aluminum oxide and nitrides in a unit of nm are used as filling powders in the field of high thermal conductivity, and zinc oxide is mostly used as a filler for thermal conductive paste (thermal conductive silicone grease).

After potting, solidified material of the adhesive becomes a bridge connecting the coil and the motor casing, which can transfer the heat generated by the coil to the motor casing, so as to transfer the heat through a heat dissipation structure to the casing. However, when a disc motor with a relatively large size is designed, for example a diameter of the disc motor is greater than 30 cm, it is required to pot more adhesive than expected to fill these gaps. Through calculation and analysis, it can be concluded that the size of the gaps is proportional to the volume in the casing, and the volume in the casing is actually $\pi r^2 h$, where h is correlation with R, therefore the amount of potting adhesive is in direct proportionate to $R^3$. Excessive adhesive will increase the weight of the motor, and the adhesive used for adhesive filling is also expensive, which will increase the cost of the motor.

Solution to the Problem

Technical Solution

The purpose of the present disclosure is to provide a novel motor stator structure and a method for potting the same in view of the above problems in the conventional technology. The purpose of the present disclosure can be achieved through the following technical solutions: a motor stator structure includes a stator casing, an iron core and a winding, an accommodating space is provided in the stator casing, and the iron core and the winding are mount in the accommodating space, where large-sized solid particles are provided in large-sized gaps between the stator casing, the iron core and/or the winding, an adhesive layer is filled in small-sized gaps between the stator casing, the iron core, the winding and/or the large-sized solid particles, the adhesive layer is formed by solidifying a liquid adhesive, the adhesive includes a binder and a thermally conductive insulating powder, and the large-sized solid particles have a particle size which is greater than a particle size of the thermally conductive insulating powder.

In the motor stator structure, the thermally conductive insulating powder has a particle diameter which is 0.05 mm or less.

In the motor stator structure, the large-sized solid particles are made of a thermally conductive insulating material, and the large-sized solid particles have a particle diameter of 0.5 mm or more. The particle size of the thermally conductive insulating powder differs from that of the large-sized solid particles in an order of magnitude. The thermally-conductive and insulating powder is mixed in a binder, and plays a role of heat conduction and insulation after being solidified. The performance of thermal conductivity and insulation of the large-sized solid particles outperforms that of the adhesive layer, while the cost of the large-sized solid particles is low, which can not only ensure the performance of thermal conductivity and insulation of the motor stator, but also reduce the amount of filled adhesive and save costs.

In the motor stator structure, a coefficient of expansion of a material of the adhesive layer is greater than a coefficient of expansion of a material of the stator casing, and a coefficient of expansion of the large-sized solid particles is smaller than a coefficient of expansion of the material of the stator casing.

In the motor stator structure, a coefficient of thermal conductivity of the large-sized solid particles is greater than a coefficient of thermal conductivity of the adhesive layer, and a coefficient of insulation of the large-sized solid particles is greater than a coefficient of insulation of the adhesive layer.

In the motor stator structure, the large-sized solid particles are made of a material with high insulation and high thermal conductivity. One or more of aluminum oxide, aluminum nitride, and diamond are easily exemplified and implemented. In the motor stator structure, the large-sized solid particles have a particle diameter ranging from 0.5 mm to 5 mm.

In the motor stator structure, the large-sized solid particles have a particle diameter ranging from 1 mm to 4 mm.

In the motor stator structure, the large-sized solid particles are spherical-shaped. In the motor stator structure, the motor stator structure is applied to a single-rotor disc motor, the accommodating space is of a shape of an annular basin, and the iron core is mount on the stator casing, the winding is mount on the iron core, the large-sized solid particles are filled between the stator casing, the iron core and the winding, and the adhesive layer is formed by injecting the adhesive into the accommodating space and immersing the large-sized solid particles and the winding with a vacuum potting process. For the stator in a single-rotor axial motor, one side of the casing is sealed, and the other side is opened, and an accommodation space sealed at one end is defined in the casing for filling the large-sized solid particles and the adhesive.

In the motor stator structure, the motor stator structure is applied to a dual-rotors disc motor, and the stator casing includes an annular inner ring and an annular outer ring, the annular inner ring and the annular outer ring are coaxially mount to define an annular accommodating space extending throughout two ends, the iron core and the winding are mount in the accommodating space, the accommodating space of the stator casing defines a cavity sealed on one side by a side sealing plate, the large-sized solid particles are filled between the stator casing, the iron core, and the winding, and the adhesive layer is formed by injecting the adhesive into the accommodating space and immersing the large-sized solid particles and the winding with a vacuum potting process. For the stator of a dual-rotor axial motor, since the two sides of the stator casing are in communication, it is required to seal one side of the casing with a cover plate during the potting, to define a cavity for filling the large-sized solid particles and the adhesive. After the adhesive is completely solidified, the cover plate is removed; for a radial motor, since the two sides are in communication and a rotor is required to be mount in a middle portion of the radial motor, after one side of the casing is sealed with the cover plate and the middle portion is filled with a filler, the large-sized solid particles and the adhesive are then added.

In the motor stator structure, the large-sized solid particles have insulating and heat-conducting functions. On the one hand, the large-sized solid particles play a role in thermal conductivity, and on the other hand, it is also required to have an insulating function, so that the thermal conductivity and insulating effect can be achieved at the same time after the adhesive is solidified.

In the motor stator structure, the large-sized solid particles are provided in the gap between the winding and the bottom of the casing.

In the motor stator structure, the large-sized solid particles are provided on a side of the winding away from the bottom of the casing, and the height of the large-sized solid particles is less than the height of the stator core.

In the motor stator structure, the height of the adhesive after being solidified is greater than the height of the large-sized solid particles. The height of the adhesive is greater than the height of the large-sized solid particles, which facilitates the solidifying of the large-sized solid particles in the adhesive, and prevents adhesiveal particles from falling and thus affecting the operation of the motor.

In the motor stator structure, the motor stator structure is applied to a radial motor, and large-sized solid particles are provided between the winding and an end of the casing.

A method for potting a motor stator structure, including the following steps:

S1. Preprocessing a workpiece, assembling an iron core and a winding together, and embedding the iron core and the winding into a casing;

S2. Adding large-sized solid particles into the casing, so that the large-sized solid particles are distributed into a gap between the casing and the winding;

S3. adding adhesive, and filling the adhesive into the casing; and

S4. solidifying the adhesive, and heating or cooling the stator so that the adhesive is completely solidified. In the method for potting the motor stator structure, the casing is of an annular hollow shape, and after the step S1 and before the step S2, one side of the casing is sealed by a side sealing plate. For the stator assembly being opened on both sides of the casing, one side is required to be sealed firstly to define a cavity for filling the adhesive, which facilitates filling the adhesive and the particles.

In the above method for potting a motor stator structure, after the step S4, the side sealing plate is removed to obtain a potted motor stator structure. After the potting and solidifying, the side sealing plate is removed to obtain the potted motor stator structure.

In the method for potting a motor stator structure, in the step S2, the large-sized solid particles are shaken while being added or being still stood for a period of time after the large-sized solid particles are added, so that the large-sized solid particles are evenly distributed.

As an alternative solution, in the method for potting a motor stator structure, in the step S3, the adhesive is shaken or is still stood for a period of time after being added, so that the large-sized solid particles are uniformly distributed in the adhesive.

In the method for potting a motor stator structure, after the step S4, it is required to stand for 3-10 minutes for the adhesive being fully infiltrated.

Advantageous Effects of the Application

Advantageous Effects

Compared with the conventional technology, the motor stator structure uses large-sized solid particles to pre-fill the gap between the casing and the winding, and then fills the adhesive, which has the following advantages.

1. The cost of the large-sized solid particles is low, and the filling of the large-sized solid particles can reduce the amount of adhesive to save costs.

2. Due to the large gap between the casing, the iron core and the winding, the gap is pre-filled with the large-sized solid particles, which reduces the total amount of filled adhesive and the overall shrinkage rate after the adhesive is solidified, so that the adhesive is filled more fully and compactly, and insulating and thermally conductive effects get better;

3. There is a relatively large difference in a coefficient of expansion between the metal casing and the solidified adhesive. When the motor expands and contracts with heat, due to the inconsistent coefficient of expansion between the metal and the solidified adhesive, a joint between the adhesive and the metal casing is commonly cracked. After the large-sized solid particles are added, since the coefficients of expansion of the large-sized solid particles is between that of the solidified adhesive and that of the metal casing, in combination with a restraining effect of the large-sized solid particles, a stress distribution of the solidified adhesive is dispersed, which can effectively prevent the joint between the adhesive and the metal casing from cracking.

4. Since the adhesive is required to be evacuated during the solidifying process, the adhesive will discharge the bubbles between the gaps, the bubbles will float and burst, so that the adhesive will be sputtered to other parts of the motor, thereby affecting the product yield, and due to the large-sized solid particles, the energy of the bubbles in the process of floating is weaken, and the bubbles become smaller and the probability of bursting is small, which can ensure that the solidified adhesive is more smooth, and also reduce the possibility of bubbles bursting and sputtering the adhesive to other parts of the motor, thereby improving the product yield.

In summary, the advantages of reducing cost, improving adhesive toughness, and improving thermal conductivity and insulation effects are simultaneously achieved according to the present application.

BRIEF DESCRIPTION OF THE DRAWINGS

Description of the Drawings

Figure 1:
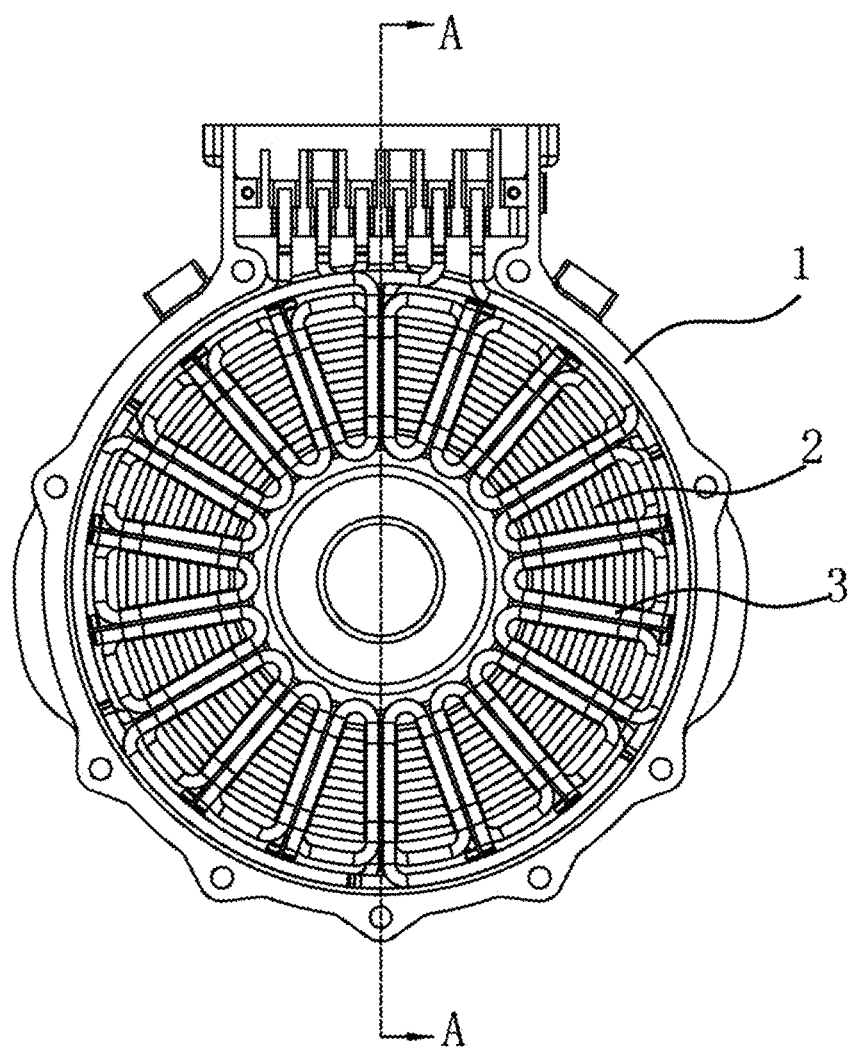
Figure 2:
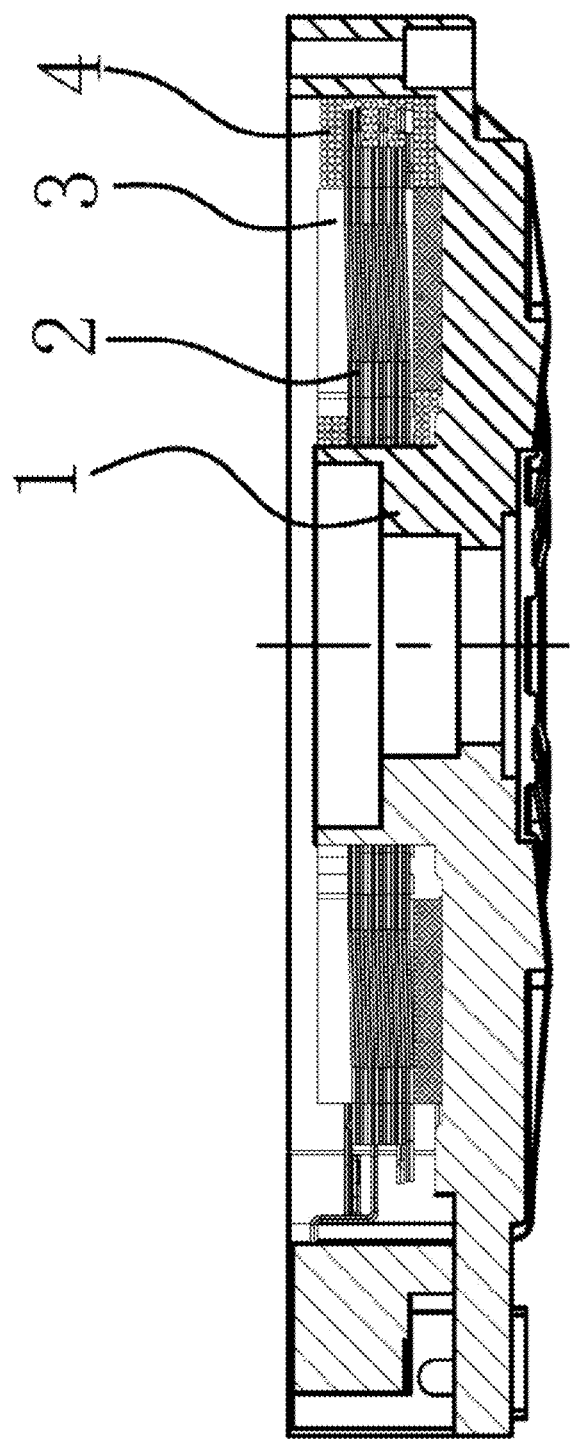
Figure 3:
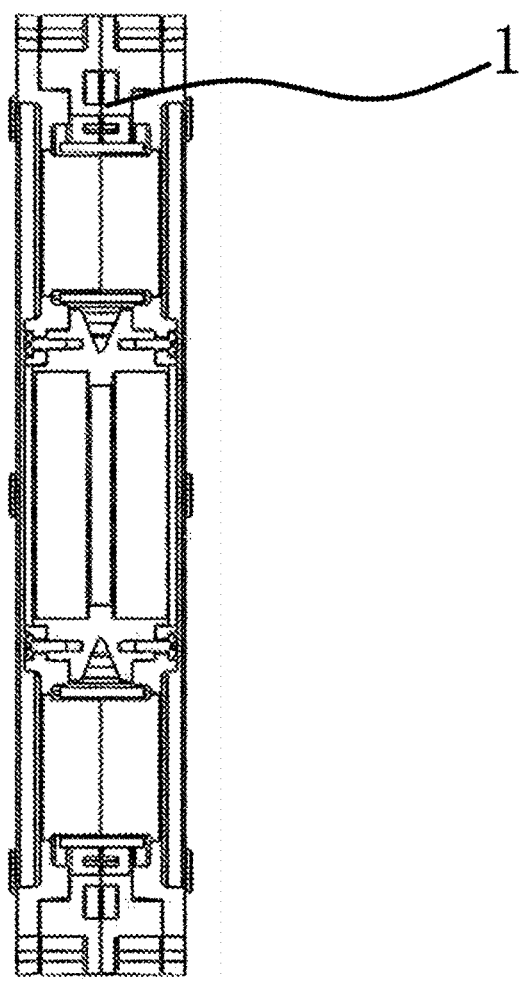

FIG. 1 is a schematic view of the assembled structure of a casing, a stator core and a winding in Embodiment 1 of the present disclosure;

FIG. 2 is a sectional view taken in a direction of A-A of the structure of FIG. 1;

FIG. 3 is a schematic view of the structure of a casing in Embodiment 2 of the present disclosure.

In FIGS. 1-3, 1 casing; 2 iron core; 3 winding; 4 large-sized solid particles.

DETAILED DESCRIPTION OF THE EMBODIMENTS

Best Mode of the Present Application

The technical solutions of the present application are further described below with reference to the specific embodiments of the present application and the accompanying drawings, but the present application is not limited to these embodiments.

Embodiment 1

As shown in FIGS. 1 to 2, a motor stator structure is provided according to the present disclosure. The motor stator structure includes a casing 1, in which an annular accommodating space is provided. A stator core 2 and a winding 3 wound on the stator core 2 are mounted in the accommodating space, and a gap between the winding 3 and the casing 1 is filled with large-sized solid particles 4, the large-sized solid particles 4 have a diameter of particle greater than both a size of a gap between coils of the winding 3 and a size of a gap between the stator core 2 and the winding 3, the large-sized solid particles 4 are spherical-shaped, and the outer diameter of the particles is 2 mm, the spherical particles are prone to fill in the gap and flow therein with a uniform filling density. Since the particle size of the large-sized solid particles 4 is greater than the size of the gap between the coils of the winding 3 and the size of the gap between the stator core 2 and the winding 3, the large-sized solid particles 4 cannot enter the gap between the coils of the winding 3 and the gap between stator core 2 and winding 3 during filing the large-sized solid particles 4 in the casing 1, which can ensure that an area with a small gap can be still filled with adhesive to prevent uneven heat dissipation. Since the gap between winding 3 and casing 1 is large, a mixture of the large-sized solid particles 4 and the adhesive can be filled. In addition, since the gap between the winding 3 and the casing 1 is large, filling the mixture of the large-sized solid particles 4 and the adhesive can improve the toughness of the adhesive and thus improve the structure strength of the motor stator.

As shown in FIG. 2, in the present embodiment, an annular accommodating space is provided in the casing 1, the large-sized solid particles 4 are distributed between the winding 3 and an inner wall on an inner diameter side of the accommodating space, between the winding 3 and an inner wall on an outer diameter side of the accommodating space, and between the winding 3 and the bottom of the casing 1, respectively. The large-sized solid particles 4 are further provided at a side of the winding 3 that is away from the bottom of the casing 1, and the height of the large-sized solid particles 4 is lower than the height of the stator core 2. The gap between the stator core 2 and the winding 3, the gap between the coils of the winding 3 and the gap between the large-sized solid particles 4 are all filled with the adhesive, and the height of the solidified adhesive is higher than the height of the large-sized solid particles 4. By filling the gap between the casing 1 and the winding 3 with the large-sized solid particles 4, the amount of the adhesive can be reduced and the cost can be saved while the thermal conductivity and insulation performance is not reduced. Since the gaps between the winding 3 and the stator core 2 and between the coils of the winding 3 are small, in order to prevent uneven heat dissipation locally, the adhesive is still filled to ensure the stability of the thermal conductivity and insulation performance of the motor stator. The height of the adhesive is higher than the height of the large-size solid particles 4, which facilitates the solidifying of the large-size solid particles 4 within the adhesive, and prevents adhesive particles from falling and thus affecting the operation of the motor. In order to further improve the heat dissipation efficiency and the toughness of the adhesive, the large-sized solid particles 4 with a small particle diameter can be filled in a relatively small gap between the winding 3 and the inner diameter side of the accommodating space, and the large-sized solid particles 4 with a large particle diameter can be filled in a relatively large gap between the winding 3 and the outer diameter side of the accommodating space.

In the present embodiment, the adhesive is mainly epoxy adhesive, and a coefficient of thermal conductivity of the epoxy adhesive is 0.1-0.21 W/M^K. Generally, oxide particles with high thermal conductivity can be added to improve the coefficient of thermal conductivity of the adhesive. The coefficient of thermal conductivity of the oxide particles is 15-201 W/M^K, the particle diameter of the oxide particles is about 5 μm to 50 μm, and the coefficient of thermal conductivity of the mixed adhesive is about 1 W/M^K. When the motor is encapsulated, the adhesive can infiltrate into the gap between the coils of the winding 3 and into the gap between the winding 3 and the iron core 2. Said gaps have a large contact area with the coil and are important components of the heat dissipation of the coils. The particle diameter of the insulating particles added in this solution is above the millimeter level, and the insulating particles cannot enter the gap between the coils of winding 3 and the gap between the winding 3 and the iron core 2.

Specifically, the adhesive is selected as ZB3231 adhesive, which is manufactured by Nanjing Zhongbei New Material Technology Co., Ltd. The main materials of the adhesive are epoxy resin, inorganic filler, solidifying agent and plasticizer, where the inorganic filler is inorganic thermal conductive powder with a particle diameter of 20 μm or less. It has been verified by experiments that the adhesive has a coefficient of thermal conductivity of 0.7 W/mK, an insulation strength of 18 kv/mm, and can withstand a high temperature of 180° C. after being solidified.

In the present embodiment, an annular accommodating space is provided in the motor casing 1, and an annular iron core 2 is mounted in the accommodating space, a winding 3 is mounted on the iron core 2. The annular accommodating space has an inner diameter of 120 mm and an outer diameter of 280 mm, and the iron core 2 has an inner diameter of 140 mm and an outer diameter of 260 mm. The size of winding 3 matches the size of core 2. The large-sized particles has a diameter of 0.5 mm-5 mm, and the insulating particles should not be too small, because the insulating particles and the adhesive are added to the motor casing 1 in batches, and cannot be stirred after the insulating particles is filled in the motor. Because a space between the winding 3 and casing 1 is tortuous, and stirring also has the risk of damaging an enameled insulating layer of the winding 3, too small insulating particle size will cause the adhesive hardly to fully fill the gap space and hardly to wrap and mix with the insulating particles, which affects the strength of products after potting. Similarly, since the insulating particles cannot be added to the adhesive for mixing and stirring in advance, the fluidity of the insulating particles will be limited after being stirred, and the insulating particles cannot enter the gap space, filling the insulating particles is difficult to operate. In addition, insulating particles in large size are difficult to be compatible with existing potting equipment. In order to facilitate the flow and uniform filling of the insulating particles, spherical-shaped insulating particles are optimal.

At the same time, according to adhesive-potting experience, it takes about 10 minutes to infiltrate the adhesive between the gap between the coils of the winding 3 and the gap between the winding 3 and the iron core 2, and fully discharge air bubbles in the adhesive. In a case that the insulating particles have a particle diameter of 0.5 mm-5 mm, the adhesive can fill the entire potting area in about 10 minutes while the potting area can be filled with as many insulating particles as possible.

Regarding the selection of the material of the insulating particles, theoretically, it is sufficient to have high thermal conductivity and high insulation properties. However, there are still many factors to be considered in practical disclosure. Some materials will cause the adhesive-filled structure to crack easily and the impact resistance is deteriorated, and some materials will cause the adhesive-filled structure to have dust and particles falling, which is absolutely unacceptable in the motor. For the selection of materials, it is determined that the materials of aluminum oxide and aluminum nitride are feasible. In addition, based on the properties of the materials and reasonable inferences, materials such as diamond are also feasible.

In the present embodiment, the method for selecting the large-sized particles is performed as follows: simulated particles with a particle diameter of 0.5 mm-5 mm are selected and are filled in a transparent cup. The specific process is as follows: ZB3231 adhesive is poured into the cup, observing its adhesive penetration and actual penetration, the permeability of ZB3231 adhesive in the simulation particles with the particle size is verified, and the selection range of the large-sized solid particles 4 is determined to be 1 mm-4 mm. In the present embodiment, the large-sized solid particles 4 of 2 mm are finally selected; volume ratios of the simulated particles in different cups are calculated respectively to determine the filling density of the large-sized solid particles 4 in the actual filling process, and the volume of the large-sized solid particles 4 accounts for 46%. The coefficients of expansion of the casing 1 and the solidified adhesive are calculated to determine the coefficient of expansion of the casing 1 to be 23.21×10-6/° C., the coefficient of expansion of the solidified adhesive to be 25×10-6/° C., and the shrinkage rate of the adhesive when being solidified is 2%-7%. In combination with the filling density of the large-sized solid particles 4, an insulating and thermally conductive material with a suitable coefficient of expansion is selected as the large-sized solid particles 4. The large-sized solid particles 4 should be able to meet the requirements of complex environment with high internal insulation, high thermal conductivity and high magnetic field in the motor. A material of aluminum oxide with a purity of ≥92% is eventually selected as the large-sized solid particles 4, where the coefficient of expansion of the material of aluminum oxide is 8×10-6/° C. The material of aluminum oxide can effectively reduce the cracking effect of the adhesive. After 300 times of cold and thermal shock tests (−30 to 60° C.), no structural defect appears. In addition, aluminum oxide has a high coefficient of thermal conductivity and a high coefficient of insulation. The insulation and thermal conductivity can be improved by using aluminum oxide as the large-sized solid particles 4. Although it is referred to as the large-sized solid particles 4 in the present embodiment, it has a performance of insulating property and thermal conductivity.

Adhesive cracking can be reduced by the above method. The original solidified adhesive layer with a great thickness is provided with a large difference of coefficient of expansion. During the process of thermal expansion and cold contraction, due to the asynchronous expansion or contraction between the solidified adhesive layer and the metal casing 1, the bonding surface between the adhesive and metal is prone to crack. The coefficient of expansion of aluminum oxide and aluminum nitride is between that of the adhesive and of the metal casing 1. The difference between the coefficients of thermal expansion of the adhesive and the metal casing 1 can be reduced or the stress distribution in the thermal expansion and cold contraction process can be dispersed by adding the particles of aluminum oxide and aluminum nitride.

The performance of two products is compared as follows:

|  | Traditional motor structure | Motor structure according to the present disclosure |
|---|---|---|
| Coefficient of thermal conductivity | 1 W/mK | 4-5 W/mK |
| Insulation strength | >18 kv/mm | >18 kv/mm |
| Cold and thermal shock 300 times (−40° 150°) | A small amount of cracking occurs between the adhesive and the casing | No structural defects |
| Appearance observation | No apparent defects | No apparent defects |

From the above data, it can be seen that the use of the insulating particles to fill the adhesive can meet the performance requirements of the motor. After the selection of the adhesive and the large-sized solid particles 4, the potting process of the motor stator structure is as follows:

S1. preprocess a workpiece, an iron core and a winding are assembled together, and the iron core and the winding are embedded into a casing;

S2. add large-sized solid particles into the casing, so that the large-sized solid particles are distributed into a gap between the casing and the winding;

S3. add adhesive, the adhesive is filled into the casing; and

S4. solidify the adhesive, the stator is heated or cooled so that the adhesive is completely solidified.

In the present embodiment, in the step S4, the solidifying process is performed by vacuum heating; the preprocessing in the step S1 is cleaning, preassembling or preheating. At first, the large-sized solid particles 4 are added to the casing 1, the adhesive is then added so that the adhesive infiltrates into the gaps of the large-sized solid particles 4, fills the gaps of the casing 1 while seal the parts to be potted and the large-sized solid particles 4. In the step S2, the large-sized solid particles 4 are shaken while being added or are still stood for a period of time after the large-sized solid particles 4 are added, so that the large-sized solid particles 4 are evenly distributed; in the step S3, after adding the adhesive, the large-sized solid particles 4 are uniformly distributed in the adhesive by being shaken or being still stood for a period of time.

In the motor stator structure, the gap between the casing 1 and the winding 3 is pre-filled with the large-sized solid particles 4, and then filled with the adhesive, which has the following advantages: firstly, the cost of large-sized solid particles 4 is low, and the filling of the large-sized solid particles 4 can reduce the amount of adhesive to save costs; secondly, due to the large gap between the casing 1 and the winding 3, the gap is pre-filled with the large-sized solid particles 4, which reduces the total amount of filled adhesive and the overall shrinkage rate after the adhesive is solidified, so that the adhesive is filled more fully and compactly, and insulating and thermally conductive effects get better; thirdly, there is a relatively large difference in the coefficient of expansion between the metal casing 1 and the solidified adhesive. When the motor expands and contracts with heat, due to the inconsistent coefficient of expansion between the metal and the solidified adhesive, a joint between the adhesive and the metal casing 1 is commonly cracked. After the large-sized solid particles 4 are added, since the coefficient of expansion of the large-sized solid particles 4 is between that of the solidified adhesive and that of the metal casing 1, in combination with a restraining effect of the large-sized solid particles 4, a stress distribution of the solidified adhesive is dispersed, which can effectively prevent the joint between the adhesive and the metal casing 1 from cracking; fourthly, since the adhesive is required be evacuated during the solidifying process, the adhesive will discharge the bubbles between the gaps, the bubbles will float and burst, so that the adhesive will be sputtered to other parts of the motor, thereby affecting the product yield, and due to the large-sized solid particles, the energy of the bubbles in the process of floating is weaken, and the bubbles become smaller and the probability of bursting is small, which can ensure that the solidified adhesive is smoother, and also reduce the possibility of bubbles bursting and sputtering the adhesive to other parts of the motor, thereby improving the product yield.

In fact, in order to ensure that the various performance indicators of the potting compound meet the requirements of designing the motor, the conventional potting compounds in the market have less choice. In addition, for motor manufacturers, there are no efforts and ability to research on and design potting compounds. Through the present design, motor manufacturers have mastered a certain ability to adjust the performance of the solidified adhesive, and can design motor products more finely, so as to design more excellent motor products.

Embodiment 2

The structure and principle of the present embodiment are basically the same as those of Embodiment 1, and the difference is in that: the motor stator structure in the present embodiment is applied to a dual-rotor disc motor. FIG. 3 shows a stator casing 1 of the dual-rotor disc motor. The stator casing 1 includes an annular inner ring and an annular outer ring. The annular inner ring and the annular outer ring are coaxially mounted to define an annular accommodating space passing throughout two ends. The iron core 2 and the winding 3 are mount in the accommodating space, the accommodating space in the stator casing 1 defines a cavity sealed on one side through a side sealing plate, the large-sized solid particles 4 are filled between the casing 1, the iron core 2, and the winding 3, and the adhesive layer is formed by injecting the adhesive into the accommodating space and immersing the large-sized solid particles 4 and the windings 3 in the adhesive via a vacuum potting process.

For the stator in the dual-rotor axial motor, since the two sides of the stator casing 1 are in communication, it is required to seal one side of the casing 1 by a cover plate during the potting to define a cavity for filling the large-sized solid particles 4 and the adhesive. After the adhesive is completely solidified, the cover plate is removed; for a radial motor, since the two sides are in communication and a rotor is required be mount in a middle portion of the radial motor, after one side of the casing 1 is sealed by the cover plate and the middle portion is filled with a filler, the large-sized solid particles 4 and the adhesive are then added.

The specific embodiments described herein are merely illustrative of the spirit of the application. Those skilled in the art to which the present application pertains can make various modifications or additions to the described specific embodiments or substitute in similar manners, but will not deviate from the spirit of the present application or go beyond the scope defined in the appended claims.

The invention claimed is:

1. A motor stator structure, comprising: a stator casing, an iron core and a winding, an accommodating space is provided in the stator casing, and the iron core and the winding are mount in the accommodating space, wherein
   large-sized solid particles are filled in large-sized gaps between the stator casing, the iron core and/or the winding, an adhesive layer is filled in small-sized gaps between the stator casing, the iron core, the winding and/or the large-sized solid particles, the adhesive layer is formed by a liquid adhesive being solidified, the adhesive comprises a binder and a thermally conductive insulating powder, and the large-sized solid particles have a particle diameter which is greater than a particle size of the thermally conductive insulating powder,
   wherein the particle diameter of the large-sized solid particles is greater than a size of a gap between the coils of the winding and a size of a gap between the iron core and the winding, so that the large-sized solid particles are prevented from entering the gap between the coils of the winding and the gap between iron core and winding, and the gap between the coils of the winding and the gap between iron core and the winding are filled with liquid adhesive,
   wherein a coefficient of expansion of a material of the adhesive layer is greater than a coefficient of expansion of a material of the stator casing, and a coefficient of expansion of the large-sized solid particles is smaller than a coefficient of expansion of the material of the stator casing.

2. The motor stator structure according to claim 1, wherein the thermally conductive insulating powder has a particle diameter which is less than 0.05 mm, the large-sized solid particles are made of a thermally conductive insulating material, and the large-sized solid particles have a particle diameter of 0.5 mm or greater.

3. The motor stator structure according to claim 2, wherein the large-sized solid particles have a particle diameter ranging from 0.5 mm to 5 mm.

4. The motor stator structure according to claim 1, wherein a coefficient of thermal conductivity of the large-sized solid particles is greater than a coefficient of thermal conductivity of the adhesive layer, and a coefficient of insulation of the large-sized solid particles is greater than a coefficient of insulation of the adhesive layer.

5. The motor stator structure according to claim 4, wherein the large-sized solid particles are selected from one or more of aluminum oxide, aluminum nitride, and diamond.

6. The motor stator structure according to claim 1, wherein the large-sized solid particles are spherical-shaped.

7. The motor stator structure according to claim 1, wherein the motor stator structure is applied to a single-rotor disc motor, the accommodating space is of a shape of an annular basin, and the iron core is mount on the stator casing, the winding is mount on the iron core, the large-sized solid particles are filled between the stator casing, the iron core and the winding, and the adhesive layer is formed by injecting the adhesive into the accommodating space and immersing the large-sized solid particles and the winding with a vacuum potting process.

8. The motor stator structure according to claim 1, wherein the motor stator structure is applied to a multi-rotor disc motor.

9. A method for potting the motor stator structure according to claim 1, comprising the following steps:
   S1. preprocessing a workpiece, assembling the iron core and the winding together, and embedding the iron core and the winding into the stator casing;
   S2. adding the large-sized solid particles into the stator casing, so that the large-sized solid particles are distributed into the large-sized gap between the stator casing and the winding;
   S3. adding the adhesive, and filling the adhesive into the stator casing; and
   S4. solidifying the adhesive, and heating or cooling the stator so that the adhesive is completely solidified.

10. The method for potting a motor stator structure according to claim 9, wherein the stator casing is of an annular hollow shape, and after the step S1 and before the step S2, one side of the stator casing is sealed by a side sealing plate.

11. The method for potting a motor stator structure according to claim 10, wherein after the step S4, the side sealing plate is removed to obtain a potted motor stator structure.

12. The method for potting a motor stator structure according to claim 9, wherein the stator casing is of an annular hollow shape, and after the step S1 and before the step S2, one side of the stator casing is sealed by a cover plate, and a middle portion of the iron core is filled with a filler.

13. The method for potting a motor stator structure according to claim 12, wherein after the step S4, the cover plate and the filler are removed to obtain a potted motor stator structure.

14. A motor using the motor stator structure according to claim 1.

* * * * *